United States Patent
Son et al.

(10) Patent No.: US 9,285,001 B2
(45) Date of Patent: Mar. 15, 2016

(54) ELECTRONIC PARKING BRAKE

(71) Applicant: MANDO CORPORATION, Pyeongtaek-si (KR)

(72) Inventors: Jong-Gu Son, Seoul (KR); Sung-Wook Yu, Anyang-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 108 days.

(21) Appl. No.: 14/306,860

(22) Filed: Jun. 17, 2014

(65) Prior Publication Data

US 2015/0167761 A1    Jun. 18, 2015

(30) Foreign Application Priority Data

Dec. 12, 2013    (KR) .................. 10-2013-0154323

(51) Int. Cl.
*F16D 65/00* (2006.01)
*F16D 65/14* (2006.01)
(Continued)

(52) U.S. Cl.
CPC .......... *F16D 65/0006* (2013.01); *B60T 13/741* (2013.01); *F16D 55/224* (2013.01); *F16D 65/18* (2013.01); *F16D 2121/24* (2013.01); *F16D2125/40* (2013.01); *F16D 2125/48* (2013.01); *F16D 2125/50* (2013.01)

(58) Field of Classification Search
CPC ... B60T 13/74; B60T 13/741; F16D 65/0006; F16D 65/18; F16D 55/22; F16D 55/26; F16D 55/31; F16D 55/224; F16D 55/2245; F16D 2121/02; F16D 2121/04; F16D 2121/14; F16D 2121/24; F16D 2123/00; F16D 2125/40; F16D 2125/48; F16D 2125/50; F16D 2125/52; F16D 2055/0058; F16D 2065/024

USPC .................. 188/72.6, 72.1, 72.3
See application file for complete search history.

(56) References Cited

U.S. PATENT DOCUMENTS

| | | | | |
|---|---|---|---|---|
| 4,804,073 A | * | 2/1989 | Taig | B60T 13/741 188/72.1 |
| 2004/0011603 A1 | * | 1/2004 | Yokoyama | B60T 13/741 188/72.7 |

(Continued)

FOREIGN PATENT DOCUMENTS

JP    2007-247683 A    9/2007

*Primary Examiner* — Anna Momper
*Assistant Examiner* — San Aung
(74) *Attorney, Agent, or Firm* — Ladas & Parry, LLP

(57) ABSTRACT

Disclosed herein is an electronic parking brake. According to one embodiment of the present invention, the electronic parking brake which includes a carrier in which a pair of pad plates disposed to press a disc rotated together with a wheel of a vehicle is installed to be moved forward and backward, a caliper housing slidably installed at the carrier and having a cylinder in which a piston is installed to be moved forward and backward by a braking hydraulic pressure, a motor disposed at an outer side of the caliper housing to generate a rotational force in forward and reverse directions, a conversion unit configured to convert the rotational force of the motor into a linearly reciprocating motion and transmit the converted force to the piston, and a decelerator disposed between the motor and the conversion unit and configured to decelerate the rotational force of the motor and transmit the decelerated rotational force to the conversion unit, includes an adaptor coupled with a rotational shaft of the motor and connected with an output gear of the decelerator, wherein the rotational shaft and an output shaft of the output gear are coaxially connected in series through the adaptor, and the output gear is supported by the adaptor to prevent shaking when being rotated.

7 Claims, 4 Drawing Sheets

(51) Int. Cl.
  *F16D 55/02* (2006.01)
  *B60T 13/74* (2006.01)
  *F16D 55/224* (2006.01)
  *F16D 65/18* (2006.01)
  *F16D 121/24* (2012.01)
  *F16D 125/40* (2012.01)
  *F16D 125/48* (2012.01)
  *F16D 125/50* (2012.01)

(56) References Cited

U.S. PATENT DOCUMENTS

2007/0068746 A1\* 3/2007 Chittka ................. F16D 65/18
  188/72.6
2007/0209888 A1\* 9/2007 Adachi ................. F16D 65/18
  188/72.7

\* cited by examiner

ELECTRONIC PARKING BRAKE

CROSS-REFERENCE TO RELATED APPLICATION

This application claims the benefit of Korean Patent Application No. 10-2013-0154323, filed on Dec. 12, 2013 in the Korean Intellectual Property Office, the disclosure of which is incorporated in its entirety herein by reference.

BACKGROUND

1. Field

Embodiments of the present invention relate to an electronic parking brake installed at a vehicle, and more particularly, to an electronic parking brake which prevents shaking of a shaft configured to transmit a braking power when the braking power is transmitted.

2. Description of the Related Art

Generally, a parking brake is an apparatus for stopping a vehicle not to be moved when the vehicle is parked, and serves to prevent a wheel of the vehicle from being rotated.

Recently, an electronic parking brake system which electronically controls driving of the parking brake is used. The electronic parking brake system is installed at a general disc brake and performs a function of the parking brake. Here, the electronic parking brake system is classified into a cable puller type, a motor-on-caliper type, and a hydraulic parking brake type.

FIG. 1 is a view schematically illustrating a conventional electronic parking brake. Here, the electronic parking brake system as illustrated in FIG. 1 is the motor-on-caliper type.

Referring to FIG. 1, an electronic parking brake 1 includes a disc D rotated together with a wheel (not shown) of a vehicle, a carrier 10 in which a pair of pad plates 11 and 12 disposed at both sides of the disc D to press the disc D is installed, a caliper housing 20 having a built-in piston 21 slidably installed at the carrier 10 and installed to be moved forward and backward and thus to press the pair of pad plates 11 and 12, a motor 60 configured to generate a driving force, a decelerator 40 configured to amplify the driving force generated from the motor 60, a gear assembly 50 configured to transmit the driving force of the motor 60 to the decelerator 40, and a conversion unit 30 configured to transmit a rotational force of the motor 60 to the piston 21.

The pair of pad plates 11 and 12 may be divided into an inner pad plate 11 disposed in contact with the piston 21, and an outer pad plate 12 disposed at an opposite side to the inner pad plate 11.

A cylinder 23 is provided at one side of the caliper housing 20, and the piston 21 configured to press the inner pad plate 11 toward the disc D is installed in the cylinder 23. A finger portion 22 bent downward and integrally connected with the cylinder 23 to press the outer pad plate 12 toward the disc D according to sliding movement of the caliper housing 20 is provided at the other side of the caliper housing 20.

The carrier 10 is fixed to a vehicle body and provided to prevent separation of the pair of pad plates 11 and 12 and also to guide the pair of pad plates 11 and 12 to be movable forward and backward toward the disc D.

When a braking operation is performed, the piston 21 is linearly moved through driving of the motor 60 and presses the inner pad plate 11 toward the disc D. The driving force of the motor 60 is transmitted to the decelerator 40 through a gear assembly 50, and the driving force is amplified by the decelerator 40 and then transmitted to the piston 21 through the conversion unit 30.

As described above, the conversion unit 30 serves to press the piston 21 toward the inner pad plate 11. The conversion unit 30 includes a spindle member 35 screw-coupled with the rotational shaft of the carrier 47 of the decelerator 40 to receive the rotational force of the motor 60, and a nut member 31 screw-coupled with the spindle member 35 to press the piston 21. At this time, a bearing 25 is installed in the cylinder 23 to support the spindle member 35.

The gear assembly 50 includes a driving gear 51 installed at a shaft 61 of the motor 60, a driven gear 54 connected with the decelerator 40, and a pinion idle gear 52 configured to connect the driving gear 51 and the driven gear 54. That is, the rotational force generated by rotation of the shaft 61 of the motor 60 is transmitted to the driven gear 54 through the pinion idle gear 52 engaged between the driving gear 51 and the driven gear 54.

Meanwhile, as described above, the gear assembly 50 may be formed to transmit the rotational force of the motor 60 through a plurality of gears, or formed to transmit the rotational force through a belt pulley (not shown).

The decelerator 50 is formed in a double planetary gear type. That is, the decelerator 40 includes a first deceleration part, a second deceleration part and an internal gear 44.

The first deceleration part includes a first sun gear 41 installed at a center shaft 53 of the driven gear 54, a plurality of first planetary gears 42 disposed around the first sun gear 41 to be engaged with the first sun gear 41, and a first carrier 43 connected with shafts 42a of the first planetary gears 42.

The second deceleration part has the same structure as the first deceleration part. That is, the second deceleration part includes a second sun gear 45 installed at a rotational shaft of the first carrier 43, a plurality of second planetary gears 46 disposed around the second sun gear 45 to be engaged with the second sun gear 45, and a second carrier 47 connected with shafts 46a of the second planetary gears 46. A rotational shaft of the second carrier 47 is connected with the conversion unit 30. At this time, the first and second planetary gears 42 and 46 are engaged with the internal gear 44 fixed to an outer side.

That is, in the electronic disc brake 1 as described above, the rotational force is transmitted to the decelerator 40 through the gear assembly 50 by an operation of the motor 60, and thus when the first sun gear 41 is rotated, the second planetary gears 42 engaged with the fixed internal gear 44 is idled, and the idling of the second planetary gears 42 is transmitted to the second deceleration part through the first carrier 43. Further, the second deceleration part transmits the rotational force to the spindle member 35 through the same operation as the first deceleration part, and thus decelerating rotation of the spindle member 35 is performed. When the spindle member 35 is rotated, the nut member 31 is moved in an axial direction, and presses the piston 21, and thus the braking operation is performed.

However, the electronic parking brake 1 as described above has a structure, i.e., a U-shaped power transmission structure in which the driving force of the motor 60 is primarily decelerated through the gear assembly 50 or the belt pulley structure, finally secondarily decelerated through the decelerator 40 formed in the double planetary gear type, and then converted into a linear force by the conversion unit 30, thereby generating the braking force. Therefore, when the disc brake is installed, sizes of the cylinder 23, the carrier 10 and the power transmission means (the motor, the gear assembly and the decelerator) becomes larger, and thus there is a limitation in which the electronic parking brake 1 should be installed at a medium or more-sized vehicle.

Further, when the braking operation is performed, a reaction force in an axial direction of the motor is applied by the multi-stage gears, and an alignment of the whole brake system is in disorder, and a noise may be generated at the side of the motor or the decelerator, and also a life span of the motor may be reduced.

Therefore, various researches and developments has been carried out to improve availability of an installation space of the electronic parking brake which automatically operates the brake using the motor, reduction of the noise, or the like.

SUMMARY

Therefore, it is an aspect of the present invention to provide an electronic parking brake which Additional aspects of the invention will be set forth in part in the description which follows and, in part, will be obvious from the description, or may be learned by practice of the invention.

In accordance with one aspect of the present invention, an electronic parking brake which includes a carrier in which a pair of pad plates disposed to press a disc rotated together with a wheel of a vehicle is installed to be moved forward and backward, a caliper housing slidably installed at the carrier and having a cylinder in which a piston is installed to be moved forward and backward by a braking hydraulic pressure, a motor disposed at an outer side of the caliper housing to generate a rotational force in forward and reverse directions, a conversion unit configured to convert the rotational force of the motor into a linearly reciprocating motion and transmit the converted force to the piston, and a decelerator disposed between the motor and the conversion unit and configured to decelerate the rotational force of the motor and transmit the decelerated rotational force to the conversion unit, includes an adaptor coupled with a rotational shaft of the motor and connected with an output gear of the decelerator, wherein the rotational shaft and an output shaft of the output gear are coaxially connected in series through the adaptor, and the output gear is supported by the adaptor to prevent shaking when being rotated.

The adaptor may include a body portion coupled to the rotational shaft of the motor to be eccentrically rotated, and a connection shaft formed at an opposite side of the body portion, which is coupled to the rotational shaft, to have a co-axis with the rotational shaft.

The electronic parking brake may further include a cover housing which is fixed to a rear side of the caliper housing and in which the decelerator is accommodated, and the adaptor may further include a first support bearing installed between the body portion of the adaptor and the cover housing to pass through the cover housing, and a second support bearing installed at the connection shaft, and the connection shaft is rotatably coupled to the output gear through the second support bearing and thus rotatably supported.

The decelerator may includes a deceleration portion including a first gear portion which has a cycloid tooth form at an outer circumferential surface thereof and is eccentrically rotated by the adaptor installed at a center thereof, and a second gear portion which has a relatively smaller diameter than the first gear portion and also has the cycloid tooth form at an outer circumferential surface thereof to be eccentrically rotated together with the first gear portion; and the output gear which has a tooth form corresponding to the cycloid tooth form of the second gear portion at an inner circumferential surface thereof to rotate on its axis when the deceleration portion is eccentrically rotated.

An inner gear having a tooth form corresponding to the cycloid tooth form of the first gear portion may be formed at an inner side surface of the cover housing and engaged with the first gear portion, and the deceleration portion may rotate on its axis and also may make a revolution due to rotation of the adaptor coupled with the rotational shaft.

A bearing may be installed between an outer surface of the output gear and the cover housing.

A first through-hole having a diameter corresponding to that of the body portion so that the adaptor is fitted therein may be formed at a center of the first gear portion, and a second through-hole in communication with the first through-hole and having a greater diameter than that of the first through-hole may be formed at a center of the second gear portion.

An insertion portion having a smaller diameter than the second through-hole and formed to protrude in a ring shape so that the second support bearing is inserted therein may be formed at one side of the output gear, and an output shaft coupled with the conversion unit may be formed at a center of the other surface thereof.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, the embodiments of the present invention will be described in detail with reference to accompanying drawings.

Figure 1:
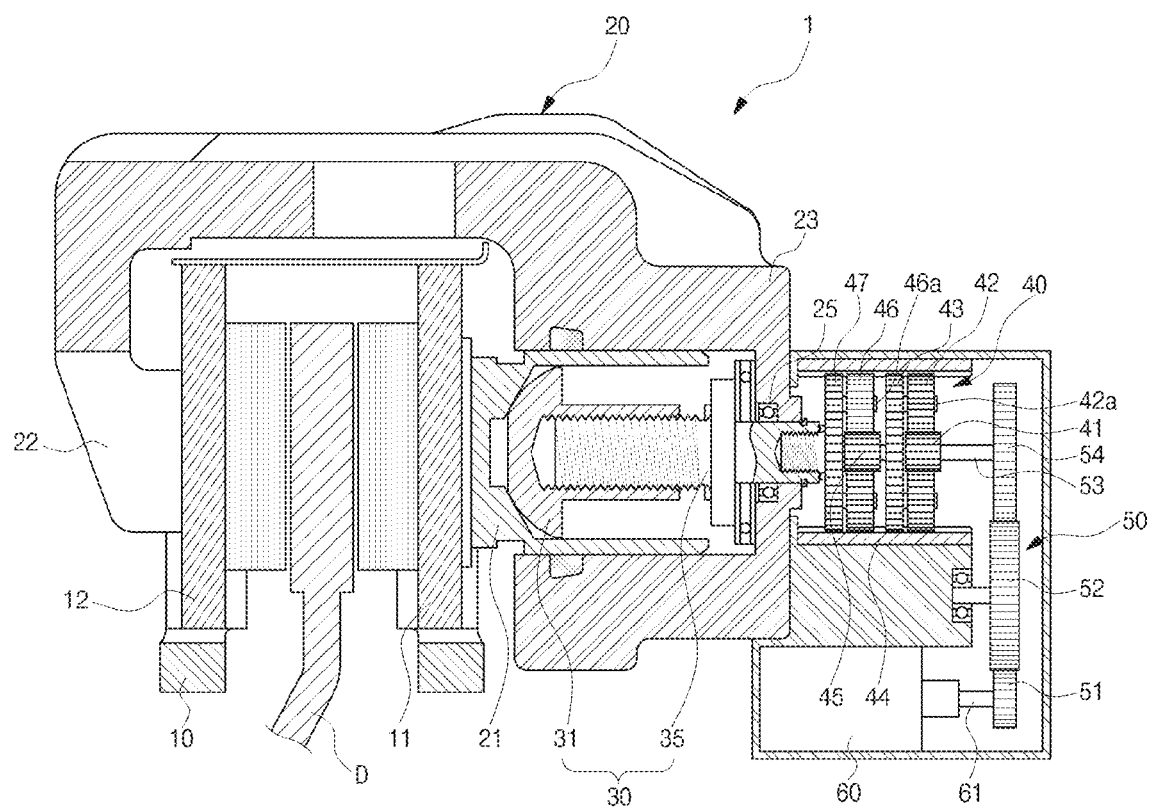
FIG. 1 is a cross-sectional view illustrating a conventional electronic parking brake.
Figure 2:
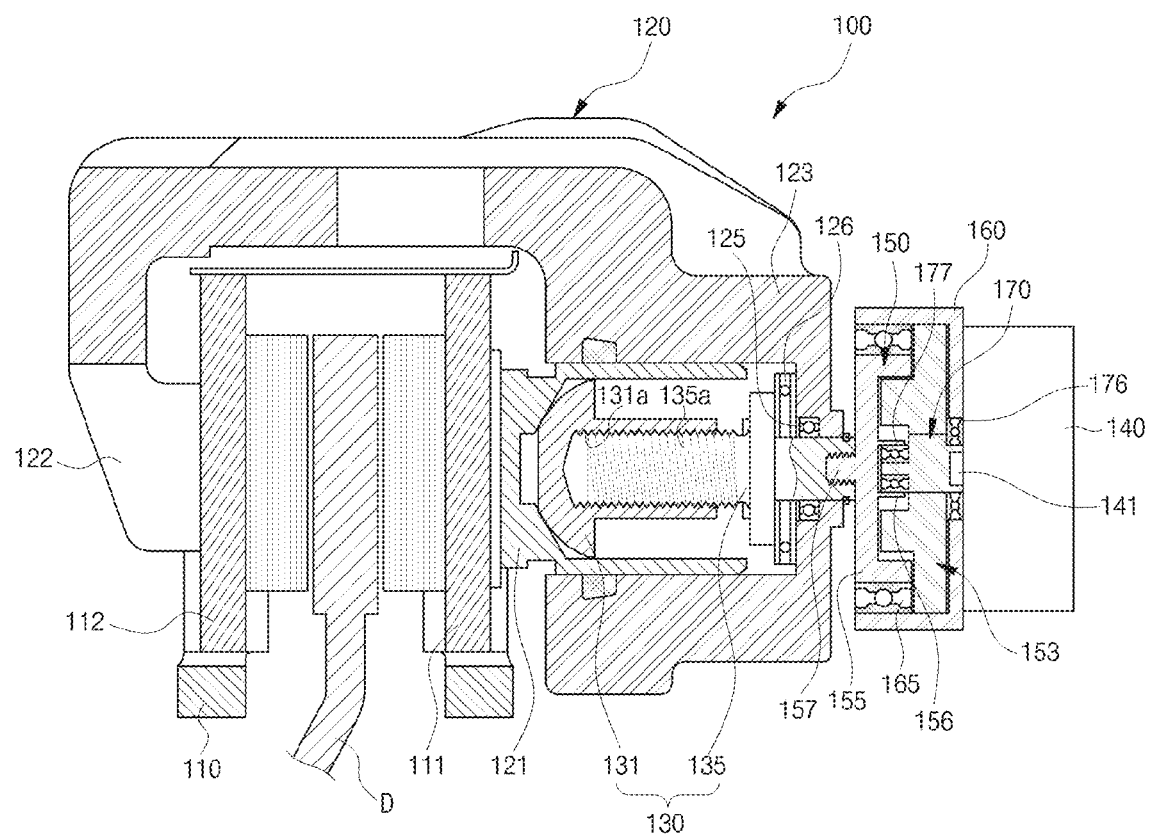
FIG. 2 is a cross-sectional view illustrating an electronic parking brake according to one embodiment of the present invention.

FIG. 2 is a cross-sectional view illustrating an electronic parking brake according to one embodiment of the present invention.

Referring to FIG. 2, the electronic parking brake 100 includes a disc D rotated together with a wheel (not shown) of a vehicle, a carrier 110 in which a pair of pad plates 111 and 112 disposed to press both side surfaces of the disc D and perform a braking operation is installed, a caliper housing 120 having a built-in piston 121 installed to be moved forward and backward and thus to press the pair of the pad plates 111 and 112, a motor 140 configured to generate a driving force, a conversion unit 130 configured to convert a rotational force of the motor 140 into a linearly reciprocating motion and to press the piston 121, a decelerator 40 provided between the motor 140 and the conversion unit 130 to decelerate the rotational force of the motor 140 and then to transmit the decelerated rotational force to the conversion unit 130, and an adaptor 170 coupled with a rotational shaft 141 and connected with an output gear 144 of the decelerator 150.

The pair of pad plates 111 and 112 may be divided into an inner pad plate 11 disposed to be in contact with the piston 121, and an outer pad plate 12 disposed to be in contact with a finger portion 122 to be described later. The pair of pad plates 111 and 112 is installed at the carrier 110, which is fixed to a vehicle body, to be moved forward and backward toward the both side surfaces of the disc D. And the caliper housing 120 is installed at the carrier 110 to be slidable in a pressing direction of the pair of pad plates 111 and 112.

A cylinder 123 having the built-in piston 121 is provided at a rear side of the caliper housing 120, and the finger portion 122 bent downward to operate the outer pad plate 112 is provided at a front side thereof to be integrally formed with the cylinder 123.

The piston 121 is provided to have a cylindrical shape recessed in a cup shape and inserted into the cylinder 123 to be slidable. The piston 121 presses the inner pad plate 111 toward the disc D by an axial force of the conversion unit 130 which receives the rotational force of the motor 140.

As described above, the conversion unit 130 serves to press the piston 121 toward the inner pad plate 111, and is provided in the cylinder 123. The conversion unit 130 includes a nut member 131 having a female screw portion 131a therein, and a spindle member 135 having a male screw portion 135a screw-coupled to the female screw portion 131a of the nut member 131.

The spindle member 135 is installed to pass through a rear side of the cylinder 123, and rotatably provided in the cylinder 123 to be parallel with a direction of forward and backward movement of the nut member 131. A plurality of bearing 125 and 126 are installed in the cylinder 123 to be spaced apart from each other and to support the spindle member 135. At this time, the bearing 126 provided between the spindle member 135 and a rear wall of the cylinder 123 is a thrust bearing, and a reaction force generated when the nut member 131 is moved forward and backward is received through the spindle member 135. The nut member 131 is provided to be in contact with the piston 121.

The motor 140 has a rotational shaft 141, and generates a rotational force in a forward or reverse direction to rotate the spindle member 135 of the conversion unit 130. The motor 140 is installed at the cover housing 160 fixed to a rear side of the caliper housing 120.

Meanwhile, the motor 140 is connected with an electronic control unit (ECU) configured to control the motor 140. For example, the ECU controls various operations of the motor 140, such as driving and stopping of the motor, forward rotating and reverse rotating, through an input signal transmitted according to a driver's command. If a break operating command or a break releasing command is applied by the driver, the ECU forwardly or reversely rotates the motor 140. Further, the ECU has a count sensor configured to count RPM of the motor 140, a current sensor configured to detect a current amount, or the like, so as to control the motor 140 through the RPM or the current amount detected by the count sensor or the current sensor. To control the motor 140 through the ECU is a well-known technique, and thus detailed description thereof will be omitted.

Figure 3:
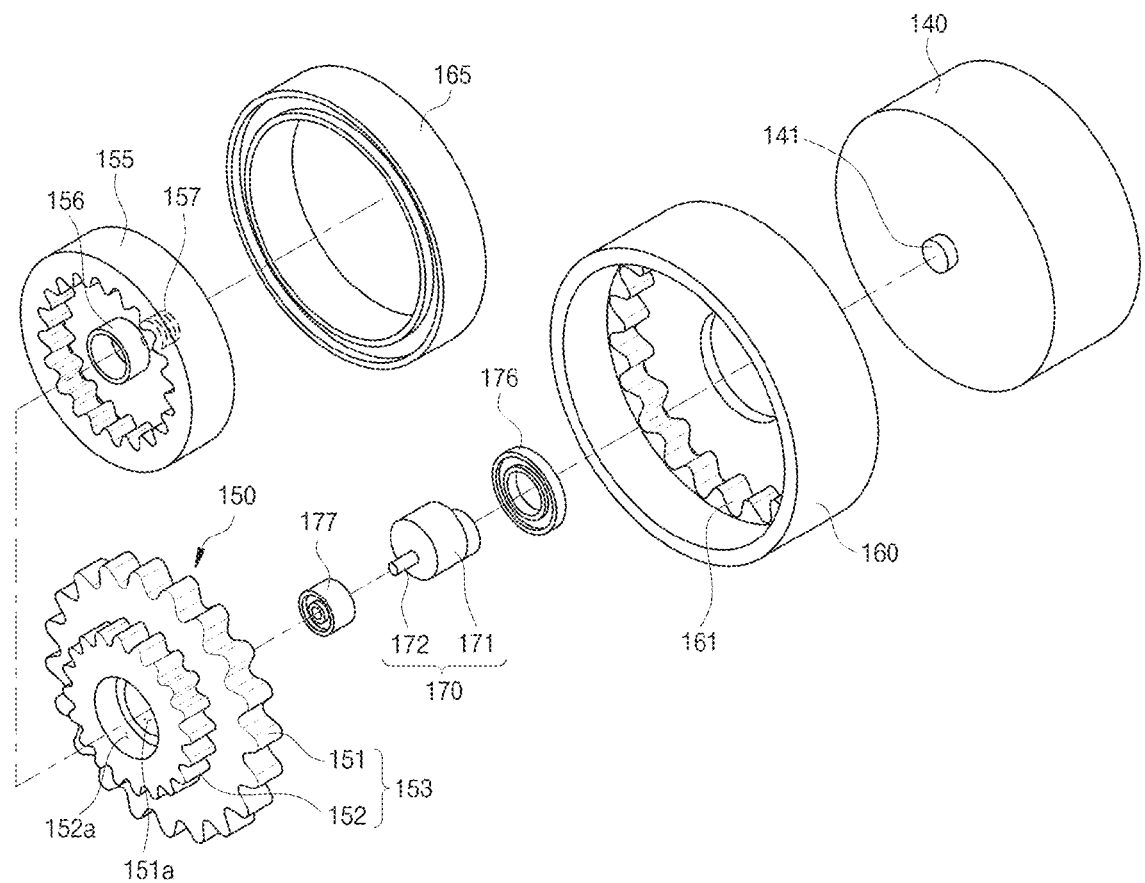
FIG. 3 is an exploded perspective view extracting and illustrating a coupling structure of a decelerator and a motor through an adaptor provided at the electronic partaking brake according to one embodiment of the present invention.
Figure 4:
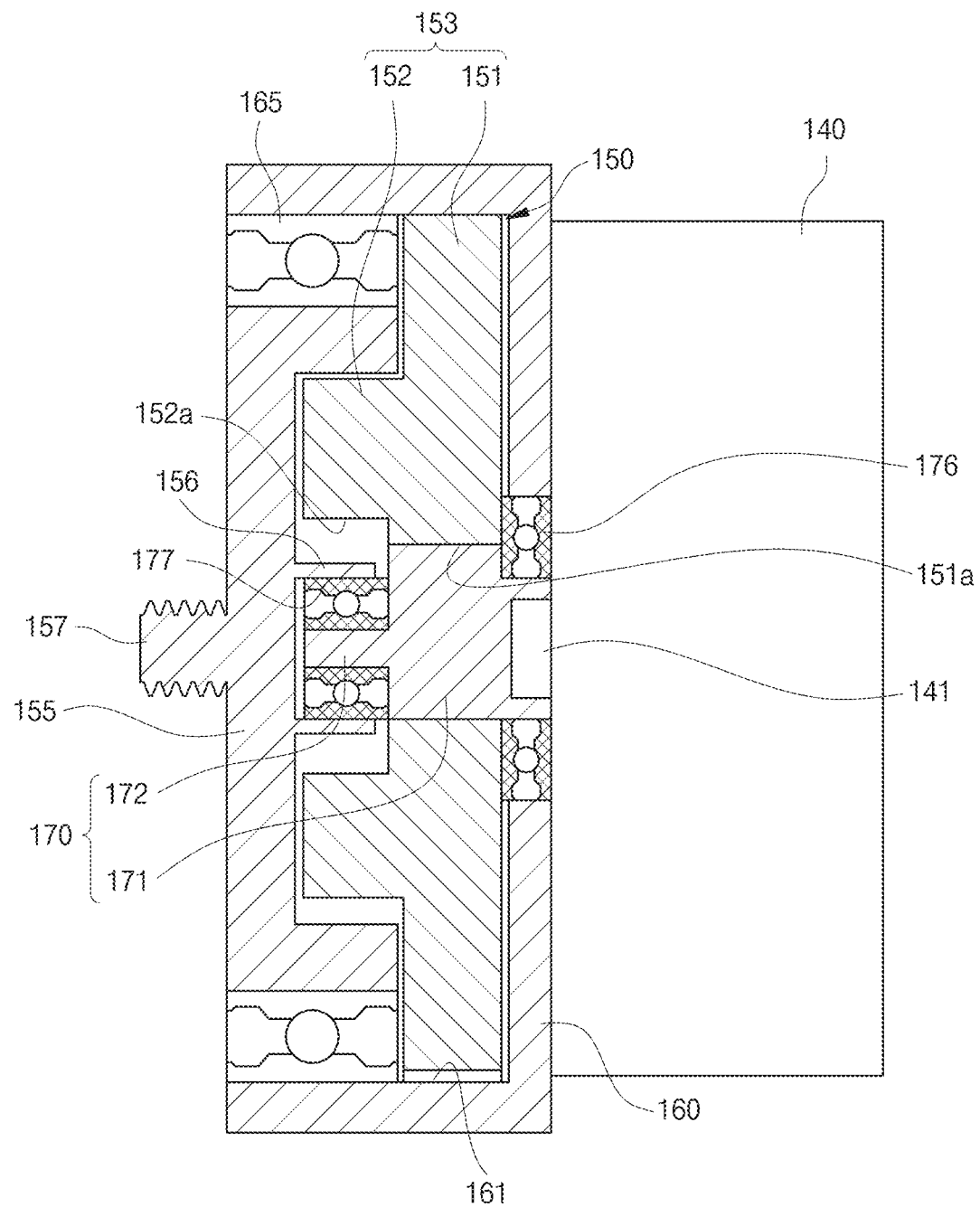
FIG. 4 is an assembled cross-sectional view of FIG. 3.

The adaptor 170 is coupled with the rotational shaft 141 of the motor 140 and connected with the output gear 144 of the decelerator 140, which will be described later. The adaptor 170 coaxially connects the rotational shaft 141 and an output shaft 157 of the decelerator 150 in series, and serves to prevent shaking of the output shaft 157 when the braking operation is performed. More specifically, as illustrated in FIGS. 3 and 4, the adaptor 170 includes a body portion 171 coupled to the rotational shaft 141 of the motor 140 to be eccentrically rotated, and a connection shaft 172 formed at an opposite side of the body portion 171, which is coupled to the rotational shaft 141, to have a co-axis with the rotational shaft 141. At this time, since the connection shaft 172 is formed to have the co-axis with the rotational shaft 141, the connection shaft 172 is coaxially rotated with the rotational shaft 141, even though the body portion 171 is eccentrically rotated.

The adaptor 170 passes through a cover housing 160 and is disposed in the cover housing 160, and both ends thereof are supported to be stably rotated when being rotated by the rotational shaft 141. Referring to the drawing, the adaptor 170 includes a first support bearing 176 installed between the body portion 171 and the cover housing 160, and a second support bearing 177 installed at the connection shaft 172. At this time, the connection shaft 172 is rotatably coupled to an insertion portion 156 of the output gear 155, which is described later, and thus rotatably supported thereto. A coupling structure with the decelerator 150 through the adaptor 170 having the above-mentioned structure will be described again below.

The decelerator 150 serves to receive the rotational force through the adaptor 170 coupled with the rotational shaft 141 and amplify a driving force. The decelerator 150 according to one embodiment of the present invention is formed in a cycloid decelerator type through a differential reducer.

The decelerator 150 receives the rotational force through the adaptor 170 coupled with the rotational shaft 141. The decelerator 150 includes a deceleration part 153 having a cycloid tooth form at an outer circumferential surface thereof and also having the adaptor 170 at a center thereof to be eccentrically rotated, and the output gear 155 configured to receive the rotational force according to the eccentric rotational of the deceleration part 153 and rotate on its axis.

The deceleration part 153 has a stepped cylindrical shape having a penetrated center. According to the drawing, the deceleration part 153 includes a first gear portion 151 having the cycloid tooth form at an outer circumferential surface thereof, and a second gear portion 152 having a relatively smaller diameter than the first gear portion 151 and also having the cycloid tooth form at an outer circumferential surface thereof. At this time, the first and second gear portions 151 and 152 are integrally formed and thus eccentrically rotated together.

A first through-hole 151a having a diameter corresponding to that of the body portion 171 so that the adaptor 170 is inserted therein is formed at a center of the first gear portion 151. Further, a second through-hole 152a in communication with the first through-hole 151a and having a greater diameter than that of the first through-hole 151a is formed at a center of the second gear portion 152. The connection shaft 172 of the adaptor 170 is disposed in the second through-hole 152a. At this time, the connection shaft 172, the second support bearing 177 coupled to the connection shaft 172 and the insertion portion 156 of the output gear 155, which will be described later, are located at the second through-hole 152a, and thus the reason why the diameter of the second through-hole 152a is formed to be greater than that of the first through-hole 151a is to prevent interference therewith, when the deceleration part 153 is eccentrically rotated.

The output gear 155 has the cylindrical shape which is recessed in a cup shape therein, and also has a tooth form in an inner circumferential surface thereof to correspond to the cycloid tooth form of the second gear portion 152. The output gear 155 is installed so that the inner circumferential surface thereof is provided at a radially outer side of the second gear portion 152. Also, the output gear 155 receives the rotational force through the second gear portion 152 according to a difference between the tooth number of the cycloid tooth form formed at the inner circumferential surface thereof and the tooth number of a gear formed at an outer circumferential surface of the second gear portion 152, and rotates on its axis.

The insertion portion 156 having a smaller diameter than the second through-hole 152a and formed to protrude in a ring shape so that the second support bearing 177 is inserted therein is formed at one side, i.e., a center of the inner surface of the output gear 155, and the output shaft 157 coupled with the spindle member 135 of the conversion unit 130 is formed at a center of the other surface thereof. At this time, the output shaft 157 is formed to be located on a co-axis with the connection shaft 172 and the rotational shaft 141 of the motor 140.

Meanwhile, a bearing 165 is installed between an outer surface of the output gear 155 and the cover housing 160 so that the output gear 155 receives the rotational force through the deceleration portion 153 and is more stably rotated than when rotating on its axis. That is, since the output gear 155 is rotatably supported to the cover housing 160 through the bearing 165, and also the both ends of the adaptor 170 connected with the rotational shaft 141 of the motor 140 and the output gear 155 are supported, the shaking of the shaft is prevented upon power transmission, and thus an operation noise is reduced.

The decelerator 150 having the above-mentioned structure is accommodated in the cover housing 160, and an inner gear 161 having the cycloid tooth form is formed at an inner surface of the cover housing 160 corresponding to the first gear portion 151 so as to rotate on its axis and also make a revolution when the deceleration portion 153 is eccentrically rotated. That is, when the deceleration portion 153 is eccentrically rotated by the adaptor 170 coupled with the rotational shaft 141 of the motor 140, the decelerator 150 rotates on its axis according to a difference between the tooth number of the gear formed at the first gear portion 151 and the tooth number of the inner gear 151, while making the revolution in the inner gear 161.

For example, when the deceleration portion 153 is rotated through the adaptor 170 in a clockwise direction, the deceleration portion 153 itself is rotated in the clockwise direction, but rotates on its axis in a counterclockwise direction along an inner side of the inner gear 161, because being engaged with the inner gear 161. Therefore, the output gear 155 receives the rotational force through the second gear portion 152 operated together with the first gear portion 151 and rotates on its axis. In other words, momentum in which the deceleration portion 153 rotates on its axis corresponds to RPM which is decelerated and output, and thus the deceleration using this is transmitted to the spindle member 135 through the output shaft 157.

Now, the braking operation of the electronic parking brake as described above will be described.

Firstly, in a state in which the two pad plates 111 and 112 are spaced apart from the both sides of the disc D (in a state in which the braking operation is released), when the driver pushes a control device (not shown), e.g., a parking switch (not shown), the motor 140 is rotated according to a signal thereof, and the driving force is generated. That is, the decelerator 150 which receives the rotational force through the adaptor 170 coupled to the rotational shaft 141 of the motor 140 is eccentrically rotated and decelerated, and the decelerated rotational force is transmitted to the spindle member 135 through the output gear 155 of the decelerator 150. At this time, the decelerator 150 may be directly connected with the spindle member 235 and may receive the rotational force. Therefore, the nut member 131 coupled to the spindle member 135 to be moved forward and backward is moved and presses the piston 121, and the piston 121 pushes the inner pad plate 111 toward the disc D, and the caliper housing 120 is slid together and presses the outer pad plate 112 to be in contact with the disc D, and thus the braking operation is performed.

Meanwhile, when the braking force is released, the spindle member 135 is rotated in a direction opposite to when the braking operation is performed, and the nut member 131 is moved to its original position, and the two pad plates 111 and 112 are spaced apart from the both sides of the disc D and restored to its original state.

As a result, since the motor 140, the decelerator 150 and the spindle member 135 are coupled in series, an entire size of the electronic parking brake may be reduced, as compared with the conventional one. Therefore, since a weight thereof may be reduced, it is possible to secure easy installability and to enhance availability of an installation space, and thus the electronic parking brake may be easily installed without limitation of a vehicle size. Further, since the both ends of the adaptor 170 configured to connect the rotational shaft 141 of the motor 140 and the output shaft 157 of the output gear 155 are supported by the first and second support bearings 176 and 177, the shaking of the shaft is prevented, and thus the braking noise may be minimized when the braking operation is performed.

In the electronic parking brake according to the present invention, since the motor, the decelerator and the conversion unit are connected in series, and the adaptor rotatably supported to connect the rotational shaft and the motor and the output gear of the decelerator is provided, the shaking is prevented when electronic parking brake is driven, and thus the operation noise can be reduced. Therefore, it is possible to provide a compact coupling structure and also to enhance the availability of the installation space, and thus the electronic parking brake may be easily installed without limitation of the vehicle size. Furthermore, since the output gear of the decelerator, which outputs the decelerated rotational force, is rotatably and separately supported from the adaptor through the bearing, the operation noise in the braking operation can be considerably reduced, compared with the conventional multistage gear assembly or belt pulley structure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic parking brake which comprises a carrier in which a pair of pad plates disposed to press a disc rotated together with a wheel of a vehicle is installed to be moved forward and backward, a caliper housing slidably installed at the carrier and having a cylinder in which a piston is installed to be moved forward and backward by a braking hydraulic pressure, a motor disposed at an outer side of the caliper housing to generate a rotational force in forward and reverse directions, a conversion unit configured to convert the rotational force of the motor into a linearly reciprocating motion and transmit the converted force to the piston, and a decelerator disposed between the motor and the conversion unit and configured to decelerate the rotational force of the motor and transmit the decelerated rotational force to the conversion unit, comprising:

an adaptor coupled with a rotational shaft of the motor and connected with an output gear of the decelerator, and the adaptor comprises a body portion coupled to the rotational shaft of the motor to be eccentrically rotated, and a connection shaft formed at an opposite side of the body portion, which is coupled to the rotational shaft, to have a co-axis with the rotational shaft, wherein the rotational shaft and an output shaft of the output gear are coaxially connected in series through the adaptor, and the output gear is supported by the adaptor to prevent shaking when being rotated.

2. The electronic parking brake according to claim 1, further comprising a cover housing which is fixed to a rear side of the caliper housing and in which the decelerator is accommodated, wherein the adaptor further comprises a first support bearing installed between the body portion of the adaptor and the cover housing to pass through the cover housing, and a second support bearing installed at the connection shaft, and the connection shaft is rotatably coupled to the output gear through the second support bearing and thus rotatably supported.

3. The electronic parking brake according to claim 2, wherein the decelerator comprises a deceleration portion comprising a first gear portion which has a cycloid tooth form at an outer circumferential surface thereof and is eccentrically rotated by the adaptor installed at a center thereof, and a second gear portion which has a relatively smaller diameter than the first gear portion and also has the cycloid tooth form at an outer circumferential surface thereof to be eccentrically rotated together with the first gear portion; and the output gear which has a tooth form corresponding to the cycloid tooth form of the second gear portion at an inner circumferential surface thereof to rotate on its axis when the deceleration portion is eccentrically rotated.

4. The electronic parking brake according to claim 3, wherein an inner gear having a tooth form corresponding to the cycloid tooth form of the first gear portion is formed at an inner side surface of the cover housing and engaged with the first gear portion, and the deceleration portion rotates on its axis and also makes a revolution due to rotation of the adaptor coupled with the rotational shaft.

5. The electronic parking brake according to claim 3, wherein a bearing is installed between an outer surface of the output gear and the cover housing.

6. The electronic parking brake according to claim 3, wherein a first through-hole having a diameter corresponding to that of the body portion so that the adaptor is fitted therein is formed at a center of the first gear portion, and a second through-hole in communication with the first through-hole and having a greater diameter than that of the first through-hole is formed at a center of the second gear portion.

7. The electronic parking brake according to claim 6, wherein an insertion portion having a smaller diameter than the second through-hole and formed to protrude in a ring shape so that the second support bearing is inserted therein is formed at one side of the output gear, and an output shaft coupled with the conversion unit is formed at a center of the other surface thereof.

* * * * *